United States Patent
Den Engelse et al.

[11] Patent Number: 5,900,708
[45] Date of Patent: May 4, 1999

[54] METHOD AND APPARATUS FOR CONTROLLING COORDINATE DISPLACEMENTS OF A PLATFORM

[75] Inventors: Peter Den Engelse, Voorschoten; Alexander Flipse, Leiden; Walter Janus, Haarlem, all of Netherlands

[73] Assignee: Becton, Dickinson and Company, Franklin Lakes, N.J.

[21] Appl. No.: 08/851,609

[22] Filed: May 6, 1997

Related U.S. Application Data

[63] Continuation of application No. 08/538,332, Oct. 3, 1995, Pat. No. 5,627,442, which is a continuation of application No. 08/053,057, Apr. 26, 1993, Pat. No. 5,459,384.

[30] Foreign Application Priority Data

Apr. 30, 1992 [NL] Netherlands ............ 92107387

[51] Int. Cl.[6] .............. G05D 3/10; G02B 21/24; G01B 21/00
[52] U.S. Cl. ............. 318/640; 318/603; 359/393; 250/491.1
[58] Field of Search ................. 318/602, 603, 318/640, 648, 649, 489; 359/393; 250/491.1

[56] References Cited

U.S. PATENT DOCUMENTS

| | | | |
|---|---|---|---|
| 3,600,057 | 8/1971 | Leffier. | |
| 3,851,972 | 12/1974 | Smith et al. | 356/72 |
| 4,202,037 | 5/1980 | Glaser et al. . | |
| 4,247,203 | 1/1981 | Levy et al. | 356/398 |
| 4,389,669 | 6/1983 | Epstein et al. . | |
| 4,427,332 | 1/1984 | Manriquez | 414/331 |
| 4,513,438 | 4/1985 | Graham et al. | 382/6 |
| 4,624,537 | 11/1986 | Hanssen et al. | 350/531 |
| 4,676,608 | 6/1987 | Faubion | 359/383 |
| 4,695,137 | 9/1987 | Jörgens et al. | 350/521 |
| 4,725,884 | 2/1988 | Gurnell et al. . | |
| 4,769,698 | 9/1988 | Ledley et al. . | |
| 4,824,229 | 4/1989 | Narita et al. | 350/531 |
| 4,833,382 | 5/1989 | Gibbs | 318/640 |
| 5,103,338 | 4/1992 | Crowley et al. | 359/394 |
| 5,276,550 | 1/1994 | Kojima . | |
| 5,390,108 | 2/1995 | Baldur et al. . | |

FOREIGN PATENT DOCUMENTS

| | | |
|---|---|---|
| 0 376 286 | 7/1990 | European Pat. Off. . |
| 3330476A1 | 3/1985 | Germany . |
| 58184508 | 10/1983 | Japan . |
| WO9204666 | 3/1992 | WIPO . |

*Primary Examiner*—Bentsu Ro
*Attorney, Agent, or Firm*—Allen W. Wark; Eric M. Lee

[57] ABSTRACT

The apparatus includes a combination of a microscope and an interactive image analysis system comprising a camera and a computer work station. The purpose of the apparatus is to facilitate the interactive control of coordinate displacements of the stage of the microscope. For each coordinate x and y an electromechanical control channel is established. At the input of the control channel two cascaded wheels in a coaxial arrangement and two angle encoders are used as a detached, independent tool which is not kinematically linked to the stage. In the middle of the control channel, the pulses of the angle encoders undergo a non-linear transformation. A processor performs a calculation which discriminates between slow displacements and fast displacements. At the end of the control channel, a flat, easily accessible platform of the microscope stage has two working areas, one for manual previewing and one for interactive scanning of a specimen.

4 Claims, 6 Drawing Sheets

METHOD AND APPARATUS FOR CONTROLLING COORDINATE DISPLACEMENTS OF A PLATFORM

This is a continuation of application Ser. No. 08/538,332 filed Oct. 3, 1995, now U.S. Pat. No. 5,627,442, which is a continuation of application Ser. No. 08/053,057, filed Apr. 26, 1993, now U.S. Pat. No. 5,459,384.

FIELD AND BACKGROUND OF THE INVENTION

The invention relates to a method and apparatus for controlling coordinate displacements of a platform. The preferred application of the invention is a microscope stage.

In general microscopy, the subject of the investigation is supported on a stage. The subject may be a slide, i.e. a package of two glass plates enclosing a specimen in the form of a layer. The slide is supported by the stage which functions like a platform and defines the object plane of the microscope. The slide plane is referenced in conventional manner having coordinates x and y.

If the specimen or probe to be viewed has an area larger than the area of the microscopic field of view, as is normally the case, the user has to select a specific area which is just under observation. The slide may be dislocated by freely shifting it on a flat surface of the platform. Otherwise the field selection is accomplished by displacements of the stage in the x,y-plane. In other words, the platform carrying the fixed specimen slide may be shifted along the x-axis and the y-axis independently.

In pathology, the microscope is the basic instrument used to visualize specimen. The microscopic analysis satisfies diagnostic purposes of various kinds. In the past decade many attempts have been made to improve the reliability of the microscopic analysis. In addition to the qualitative information which is traditionally collected by a microscope, more and more quantitative information is gained. In order to collect the quantitative information, a computer-based image analysis system has been established around the microscope. Most of the known image analysis systems are of an interactive nature, i.e. the user performs a dialogue with the programmed computer in the course of collecting the optical information. An important interactive contribution of the user is to select the microscopic field to be measured.

Normally it is intended in such interactive image analysis systems to screen the complete slide only once. There is a need for an economical, systematic investigation of specimen having a relatively large area as compared to the necessary resolution of details. The machine performance may be enhanced by tracing and recording the x-y-position of the stage. Thus, the computer may not only forward position displacement signals to the microscope, but also gets a feed back signal on the position of areas which have already been screened. This means that the microscopes stage should be equipped with position read-out facilities.

There are two principal ways to perform the field selection when the slide is fixed on the platform: 1) the classical mechanical drive by two direct handling wheels or 2) an electro-mechanical drive which is typically used in conjunction with x,y-controllers of computers. Both principles will be explained now by referring to the prior art.

European Patent Application EP 317139 discloses a system for measuring selected features of cell parameters by optical identification of marked cells. The known system functionally operates as a digital image analysis and processing system. The apparatus comprises a high resolution microscope enabling an operator to view magnified specimen on a support, in a preferred embodiment a glass slide. The microscope includes adjustment or positioning means for focusing its optics on the slide and a platform movable incrementally in two directions via positioning means in order to view different areas thereof. Positioning means are in the form of mechanical adjustment verniers which are conventional for instrument quality microscopes.

The known microscope stage is fitted with an x-y sensing device having an accuracy of about 10 $\mu$m in the microscope slide plane. These sensors are computer-interfaced and are constantly read by the system. They are used with special microscope slides having marks on the glass plates to record the relative x-y position of any image acquired by the system. This x-y-position detecting and recording mechanism is useful in experimental situations where a great amount of image information has to be evaluated. The microscope slide itself may be used, so to say, as an image storage medium. The microscope slide is accessed just like an image storage medium, e.g. when experiments are repeated or when a back-up memory for the digital image store is helpful or when complete sets of digitized images would require an enormous storage capacity.

A second example of a known microscope is marketed under the tradename Westerboer. The stage of Westerboer has—for each direction x, y—two different parallel-acting drive means in order to control the displacements in the x,y-plane. The first drive means is the conventional mechanical control of a microscope stage. The second drive means is a computer-aided electro-mechanical control of the stage. Both the mechanical and the electro-mechanical drive are linked in parallel to the known stage.

The conventional manual drive of the Westerboer microscope stage is operated by means of two cascaded wheels placed on the same axis. With the aid of gears the wheel movement is translated into the stage movement.

The second drive means of the known stage employs a so-called mouse or a so-called joy-stick to input desired x and y coordinates to a computer. The position command signals are decoded in the computer and transformed into corresponding drive signals. The drive signals are outputted from the computer to control a x-motor and a y-motor. The x-motor rotates a spindle having a threading for s a correspondingly threaded member of the stage. The y-motor rotates a y-spindle; the y-spindle rotation is transformed into a shift of the stage in y-direction by another threaded member. The motors for driving the known stage are DC servo motors which act in the known manner by comparing an input DC signal and a DC feedback signal of a position sensor belonging to the servo motor. If the difference between both DC signals is zero, the DC motor stops at the desired position.

The spindles of the electro-mechanical drive and the racks of the mechanical drive are commonly attached to the stage. The user decides whether he wants to actuate the conventional manual drive or the joystick/mouse of the computer-aided drive. Both drive means are mechanically interconnected by the driven stage itself. On actuation of the x-handling wheel, the displacement of the stage leads also to a rotation of the x-motor spindle. On the other hand, by actuating the mouse or the joy-stick, the DC-motor will not only shift the stage, but will also move the drive mechanism of the cascaded wheels. Hence, a mechanical connection exists between the handling wheels and the servo motors.

SUMMARY OF THE INVENTION

It is an object of the invention to provide the user with a platform, in particular a microscope stage, which can easily be displaced.

It is another object of the invention to account for a definite tactile feeling when the user handles the stage.

It is another object of the invention to ease the reviewing task when the user has to perform very small displacements of the stage with high accuracy.

It is another object of the invention to ease the reviewing task when the user has to perform large displacements with a minimum of handling activity.

It is another object of the invention to allow for simple previewing of a specimen.

It is another object of the invention to help the user in a specific application mode to ensure that the complete slide is screened only once.

It is another object of the invention to enable the user in another application mode to easily relocate specific areas which have already been screened.

One aspect of the invention resides in the use of a conventional long-proven manual input mechanism in conjunction with a computer-aided positioning facility. The classical input arrangement having two cascaded wheels in a co-axial arrangement is used as a detached, independent tool which is not kinematically linked to the stage or to any drive motor. The known direct mechanical connection to the stage is replaced by an electro-mechanical control channel. Nevertheless, the manual operation by the user is maintained in the sense that the handling of the stage displacement requires the same feeling as if the cascaded wheels were directly connected to the stage of a conventional microscope. It is not only the arrangement of the handling wheels at the stage which is maintained; it is also a similar mechanical resistance or friction which is felt by the user when he rotates the handling wheels. Thus, the user can employ his tactile and visual still which he has acquired in long experience, to perform the coordinate displacements of the stage.

While providing for known and long-proven signal input properties on the user side of the interactive system, the electro-mechanical control channel as a whole is no linear model of the known mechanical gear drive. The rotation of the handling wheel is mechanically transmitted into a shaft rotation of an angle coder. The angle coder acts as an electro-mechanical transducer in a manner which is known as such. The angle coder outputs a series of pulses the number of which is proportional to the angular displacement of the shaft and hence proportional to desired displacement of the stage. The pulse sequence is transmitted to a pulse decoder, typically a counter, which registers the desired displacement signal. Up to this interface of the position signal channel, all signal transmissions and signal transductions are linear or quasi linear operations. The following processing step of the invention is of non-linear nature. A processor, typically a digital computer, evaluates the incoming pulse sequence. The pulse count is proportional to the desired displacement and the frequency of the pulses is a measure of the speed employed by the user when rotating the handling wheel. The invention has recognized that the speed and hence the pulse frequency is a useful indication of the intention of the operator. If the operator intends only tiny displacements being in the order of magnitude of the positional resolution, he will rotate the handling wheel very slowly. If the operator intends a great displacement he will spin the handling wheel with high speed for the purpose of time saving. The computer detects the speed applied by the user and calculates an output position signal which is a function of the detected speed. The output signal is a non-linear transformation of the conventional input signal and is converted into a suitable motor drive signal. At the end of each signal channel a motor acts as an electro-mechanical transducer for displacing the stage along is the displacement coordinates x or y.

To allow for easy previewing, a separate location on the stage surface is made accessible by appropriate x and y displacements of the table. The surface of the table around the previewing area is flat over a sufficiently large x, y area to allow for unobstructed movement by hand of the slide.

The microscope stage of the invention comprises a x-plate and a y-plate and associated drive means which are arranged below the level of a flat surface of the platform. The arrangement is freely accessible from the front side, the left-hand side and the right-hand side of the platform. The upper plate of the platform has two working areas, one for manual previewing and one for interactive scanning of a specimen. Two push buttons are arranged in the immediate neighborhood of the two coaxial handling wheels. One push button triggers a predetermined dislocation to switch the stage position from the previewing area to the scanning area and vice versa. The second push button is used to memorize in the computer selected positions of the specimen.

The invention as a whole supports the interactive handling of a sophisticated image analysis system in such a manner as to preserve proven techniques and to integrate novel techniques of displacement.

BRIEF DESCRIPTION OF THE DRAWINGS

The invention is explained in greater detail below by means of examples shown in the drawings.

a: traction belt transmission b: angle encoders mounted on the wheel shafts.

Figure 3:
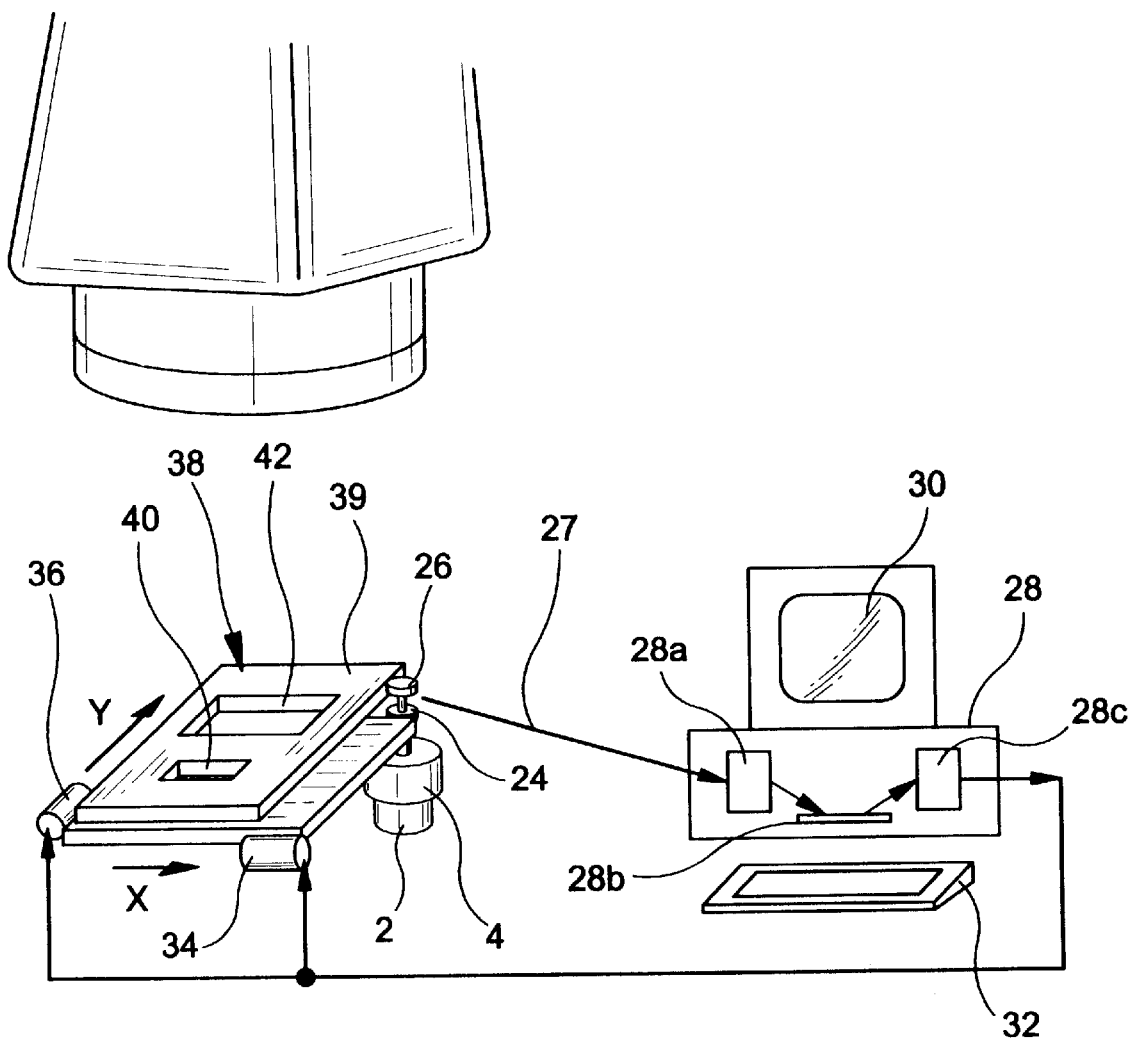

FIG. 3 is a block diagram of the position signal flow according to a preferred embodiment of the invention.

Figure 4:
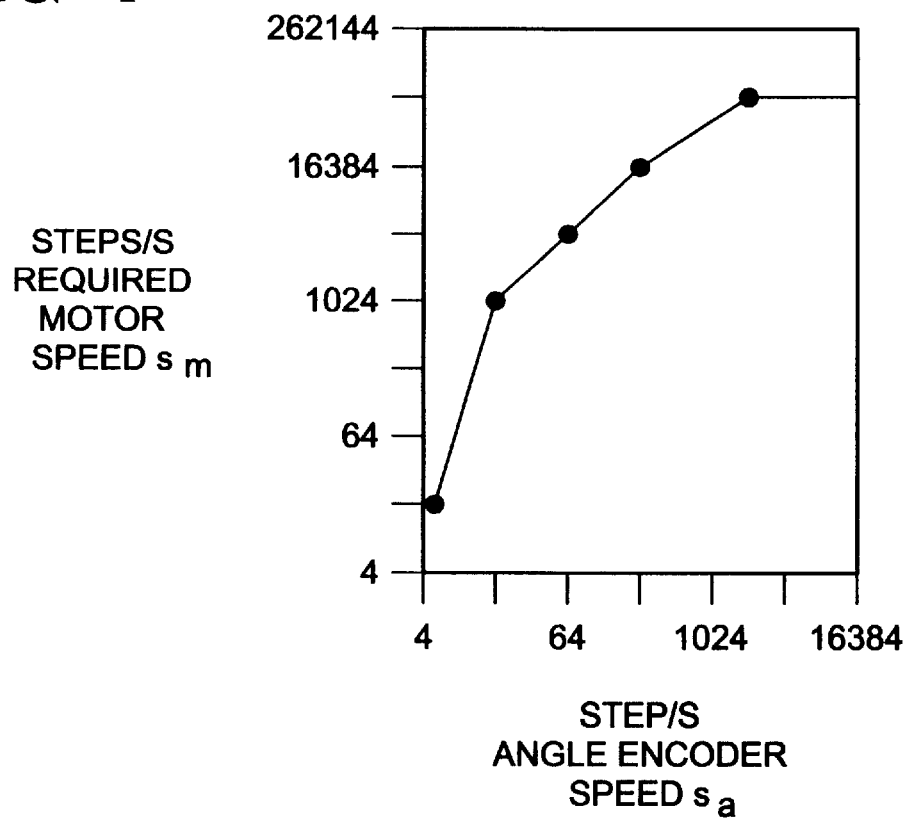

FIG. 4 is a graph of the preferred non-linear function which is applied to the position signals a speed-dependent calculation.

Figure 5:
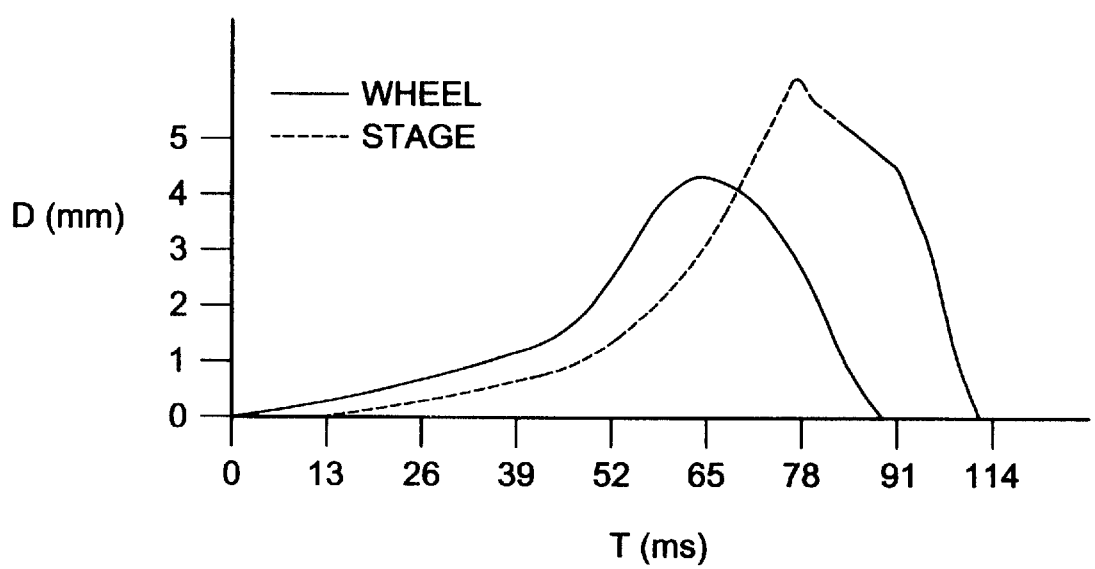

FIG. 5 is a displacement timing diagram for comparing an example of the system input and the system response.

Figure 6:
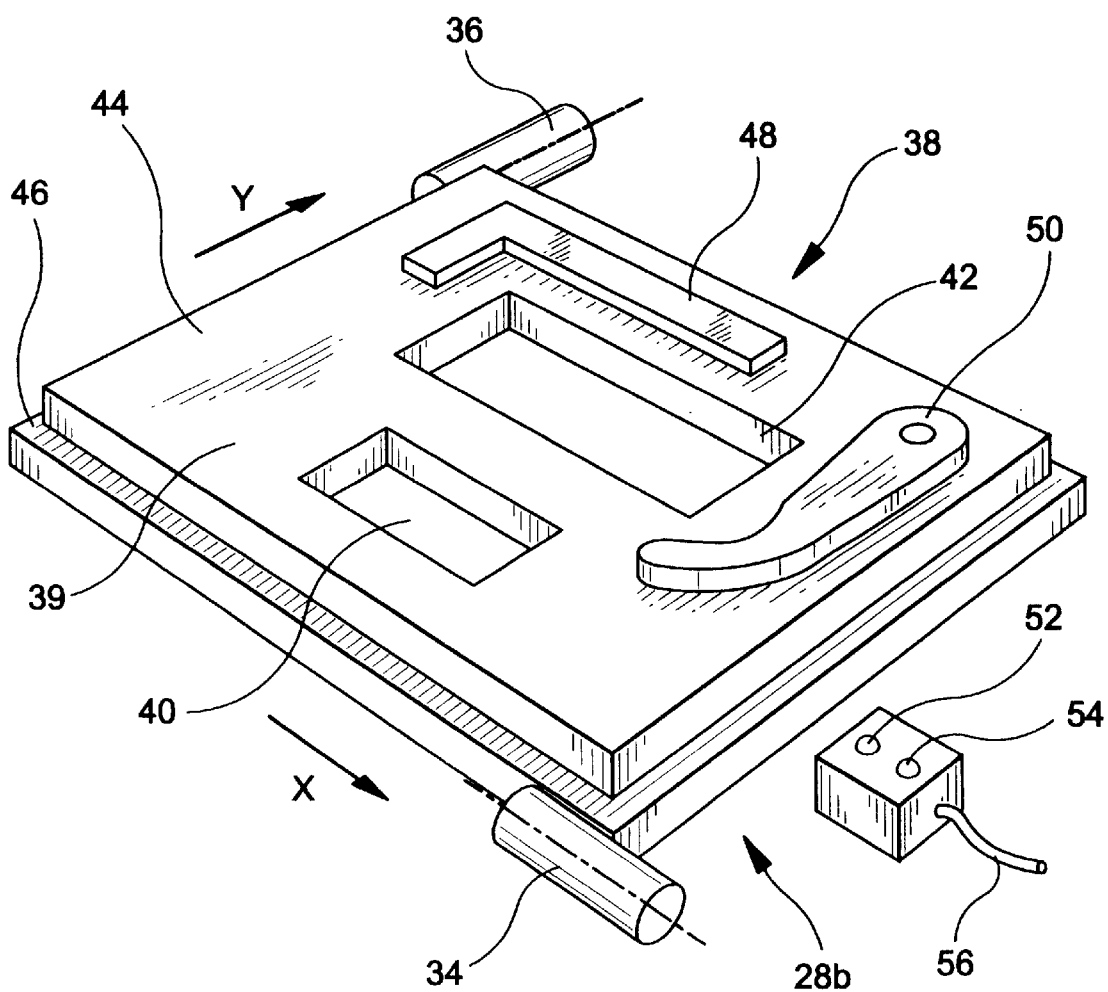
Figure 7:
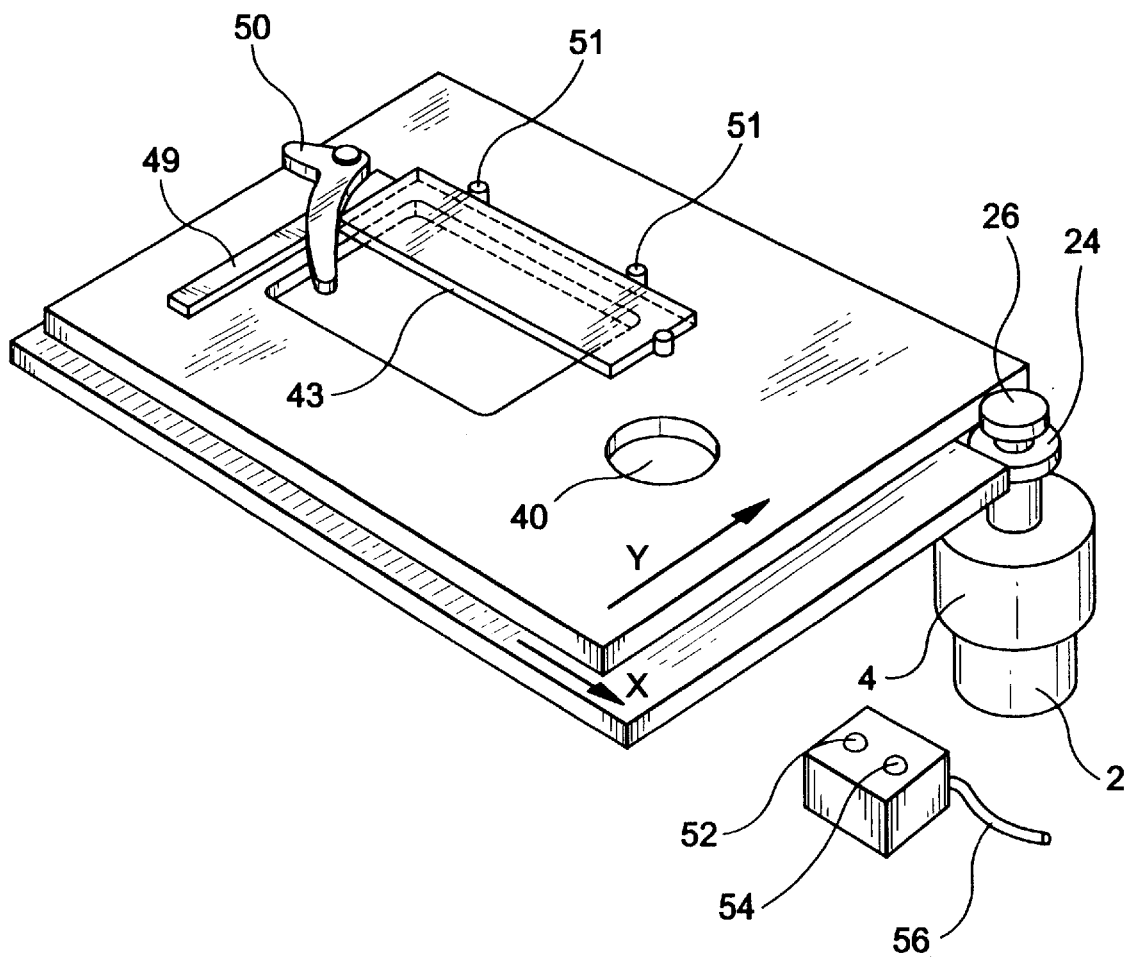

FIG. 6 and FIG. 7 are more detailed views of the stage of FIG. 3 according to the invention.

DETAILED DESCRIPTION OF THE PREFERRED EMBODIMENT

Figure 1:
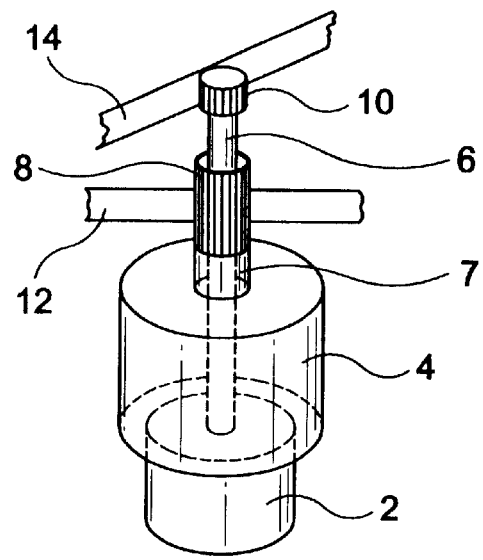
FIG. 1 shows the conventional manual drive of a microscope stage having two cascaded wheels.

FIG. 1 depicts a conventional form of controlling the displacements of a microscope stage in the x,y plane. The conventional manual microscope stage is operated by means of two wheels 2,4. The manual displacement wheel 2 controls the displacement of a platform in the x direction, whereas the manual displacement wheel 4 controls the displacements of a platform in the y direction. The coordinates x and y form a rectangular Cartesian coordinate system. Any rotation of the wheels 2,4 is transformed into stage translations by means of gears. The gear for the x-control consists of a cog wheel 10 and a corresponding cog bar or rack 14. The x cog wheel 10 is mounted on a shaft 6 of the x wheel 2. The x rack 14 is attached to the stage in the extension of the x direction in a manner not shown in FIG. 1. In corresponding manner the y gear consists of a y shaft 7, a y cog wheel 8 and a y rack 12 extending in the y direction of the stage.

As one of the cog wheels 8 or 10 is rotated by a manual spin of one of the two manual displacement means 2 or 4, the corresponding rack 12 or 14 is shifted in x direction or y direction, respectively. One revolution of the x wheel 2 may move the stage over a distance of 2 cm, while the y wheel 4 may account for 1.5 cm displacement per revolution in the y direction.

In the prior art referred to as the Westerboer stage, the manual displacement wheels 2 and 4 are coaxially arranged on the right hand side of the stage. In the prior art stage according to EP 317 139, the x wheel is arranged on the front side of the stage and the y wheel is arranged on the right-hand side of the stage. In any case the x wheel and the y wheel are independently operable and are located below the platform.

The invention replaces the gears by angle decoders. Since biologic specimens are analyzed, it should be possible to position the stage within an accuracy of 1 to 2 μm. An accuracy of 2 μm, together with the 2 cm displacement of the stage, requires an angle encoder having a resolution of up to 100,000 steps per revolution. In general, angle encoders with so many pulses per revolution are large in size. Hence such angle encoders can not be mounted on the axis of the coaxial wheels. In the preferred embodiment according to FIG. 2a, the two angle encoders 20 and 22 are offset from the shafts 6 and 7 and two traction belts 16 and 18 are used as a mechanical transmission from the displacement means 2 and 4 to the high resolution angle encoders 20 and 22. Smaller angle encoders can be mounted on the axis of the coaxial wheels 2 and 4. FIG. 2b depicts two low resolution angle encoders 24 and 26 directly mounted on the shafts 6 and 7 of the coaxial cascaded wheels 2 and 4.

Figure 2A:
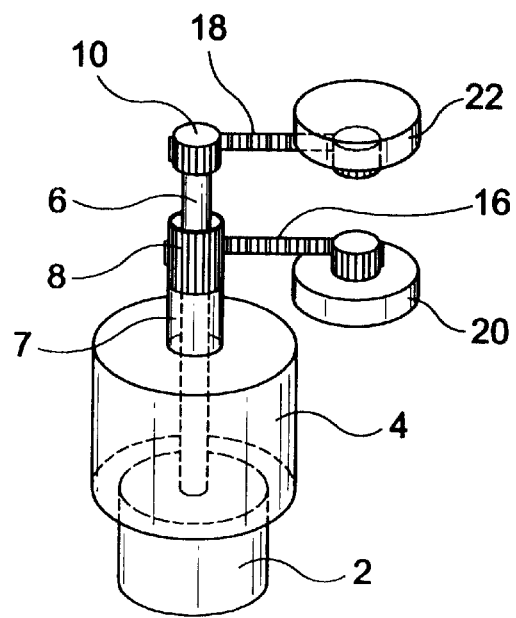
FIG. 2a and 2b show two examples of mechanical transmissions between cascaded wheels and angle encoders according to the invention.
Figure 2B:
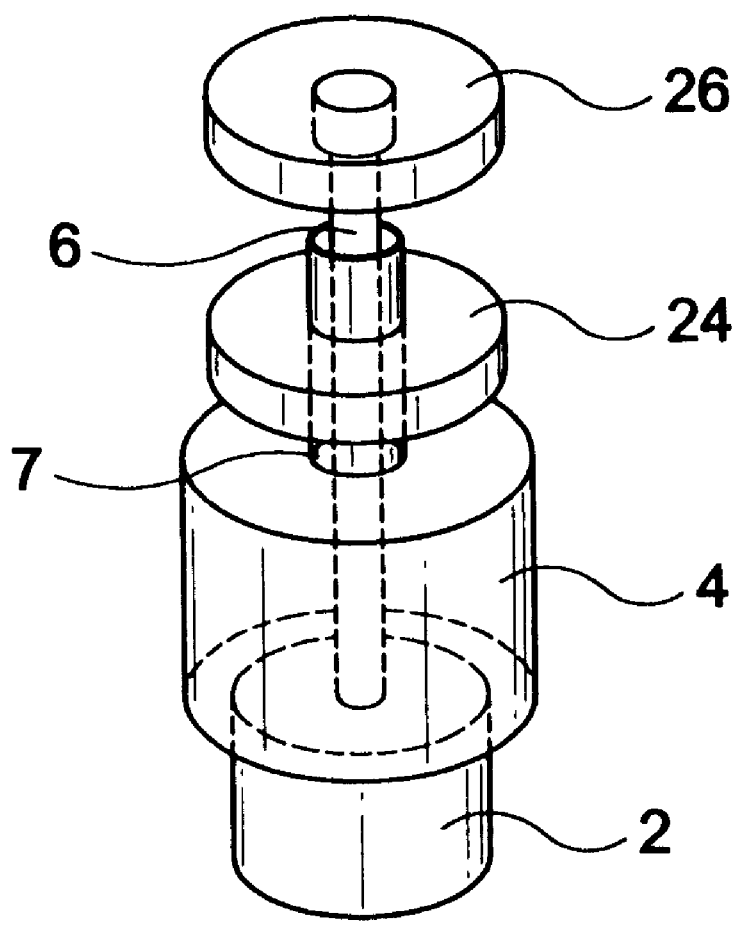

In the preferred embodiment according to FIG. 2a, a x cog wheel 10 is mounted on the x shaft 6 of the x wheel 2. Mechanical transmission from the x cog wheel 10 to the x angle encoder 22 is performed by the x traction belt 18. The x traction belt 18 is only partly depicted so that the cogs on the inner surface of the x traction belt 18 and on the outer surfaces of the x cog wheel 10 and the angle encoder cog wheel 22 are visible.

In corresponding manner rotation of the y wheel 4 is mechanically transmitted via the y shaft 7, the y cog wheel 8 and the y traction belt 16 to the y angle encoder 20. in the preferred embodiment both angle encoders 20 and 22 have a resolution of 2048 steps per revolution. Each step generates a pulse output which is an electrical pulse in the preferred embodiment. But it is likewise possible to use position encoders which generate light pulses.

The angle encoders 20 and 22 are equipped with a screw. The tighter this screw has been fastened the more resistance the user will observe. Preferable the screw is fastened so tight that the mechanical resistance or friction which is felt by the user is equal to the conventional wheel arrangement according to FIG. 1.

Turning to FIG. 3, the wheel/encoder arrangement of FIG. 2b is depicted to replace in a microscope stage 38 the known wheel/rack arrangement of FIG. 1. In case the smaller low resolution angle encoders 24, 26 according to FIG. 2b are sufficient to control the platform 49, the wheel encoder arrangement 2, 4, 24, 26 looks very much like the known wheel/rack arrangement 2, 4, 12, 14, however the angle encoders 24, 26 are slightly detached from the x plate 46 and the y plate 44 of the platform 39.

In case the preferred high resolution angle encoders 20, 22 are used, the small angle encoder 24 in FIG. 3 is replaced by the cog wheel 8, the traction belt 16 and the more voluminous encoder 20. In like manner the small angle encoder 26 is replaced by the cog wheel 10, the traction belt 18 and the more voluminous encoder 22. Again, the cog wheel 8, 10 have no mechanical connection to the x plate 46 and the y plate 44 of the platform 39.

Continuing in the order of the signal flow, the angle encoders 24 and 26 transduce the mechanical input signal into a number of pulses. The number of pulses is proportional to the mechanical rotation of the wheels 2 or 4 in accordance with the resolution of the angle encoder 24 or 26. The preferred resolution is 2048 pulses per revolution.

The pulses are transmitted via a cable 27 to a pulse decoder board 28a of a computer 28. In the preferred embodiment the cable 27 has electrically conducting leads and the transmitted pulses are electrical pulses. But it likewise possible to use a light guide and to transmit light pulses from the angle encoders 24, 26 to the pulse decoder circuit 28a.

The pulse decoder 28a receives the transmitted pulses and registers the pulse input displacement signal for each coordinate x and y. The pulse decoder 28a comprises a counter for registering the pulses of the input displacement signal. The pulse count of the pulse decoder circuit 28a is sampled at a sample rate of 75 Hz. The pulse decoder 28a consists of four 16 bit pulse counters. Both the x and y direction need two counters to register the pulses both in the left and right direction. Because the angle encoders provide 2048 pulses per revolution, the system can cope with 32 revolutions within the sample time of 13.3 ms. The sample time of 13.3 ms is the inverse of the 75 Hz sample rate. Hence the possibility of an overflow in one of the counters may be excluded.

If the position of the angle encoder at sample i is called p (i), and the speed of the angle encoder is called $s_a$, the angle encoder speed $s_a$ is given by:

$$S_a(i) = (p(i) - p(i-1)) * 75 \text{(steps/s)} \quad \text{(Equation 1)}$$

This calculation is performed on-line by a program processor board 28b of the computer 28 (see FIG. 3) A program running in the background mode detects any movement of the wheels 2, 4 and calculates a pulse output displacement signal from the pulse input displacement signal. In the preferred embodiment of the invention a non-linear function is applied to the pulse input displacement signals by the program processor board 28b and the result of the non-linear transformation is converted into motor drive signals by the motor driver circuit 28c.

The program processor board 28b is preferably equipped with a processor 386 Intel or 486 Intel, but a 286 Intel will also be supported. The program runs under the MS-DOS operating system, version 3.3 or higher.

The calculation of the program processor board 28b is explained in conjunction with FIG. 4. The non-linear function applied to the pulse counts depends on the speed of the manual actuation of the displacement means. The angle encoder speed $S_a$ is converted into a motor speed $S_m$ in accordance with the following formula:

$$s_m(i) = \begin{cases} \text{sign}(s_a(i)) * s_a(i)^2 & \text{if } s_a(i) < c_{sw} * 75 \\ \min(s_a(i) * c_{sw}, 170000) & \text{if } s_a(i) > c_{sw} * 75 \end{cases} \text{(steps/s)} \quad \text{(Equation 2)}$$

$S_m(i)$ is the motor speed in steps per second at sample i required for the dislocation of the stage, $c_{sw}$ is a switch constant which adapts the formula of Equation 2 between a high speed mode and a low speed mode. In the high speed mode the switch constant $C_{sw}$=64. The high speed mode is the default mode of the non-linear calculation and the corresponding function is depicted in FIG. 4. The angle encoder speed $S_a$ and the required motor speed $S_m$ are given in a double-logarithmic scale. The non-linear speed relation is a quadratic function in a predeterminable low speed range. The quadratic function is characterized by a gradient of 2 in the double logarithmic scale of FIG. 4. In the subsequent high speed range a linear relation is used which is characterized by a gradient 1 in the double logarithmic scale of FIG. 4. For very high angle encoder speeds $S_a$ the motor speed $S_m$ is limited to 170000 steps per second which corresponds to the maximum speed of the motor.

The program and the corresponding function of FIG. 4 (Equation 2) may be switched to a low speed mode. The switch constant $c_{sw}$ in Equation 2 is set to a value of 16, whereby the linear section of the relation is expanded resulting in a decreased motor speed $S_m$ in the middle range.

It is noted that there is no fixed relationship between the number of input pulses received by the pulse decoder circuit 28a and the number of output pulses sent to the motor driver circuit 28c. Assume that a full rotation of the x wheel 2 is accomplished at very low speed. Accordingly the pulse frequency of the x angle encoder 26 is very low and is converted into a very low pulse frequency of the motor speed signal $s_m$. An integration of the output pulses in the relatively long interval yields a certain output dislocation. In contrast, the 2048 input pulses of one revolution maybe generated at a higher pulse frequency in a shorter time interval. According to the quadratic increase of the output pulse frequency the increase in the number of output pulses is higher than the normal increase resulting from the shorter time interval. It is thus an inherent feature of the program processor board 28b that a low pulse frequency generates a lower output displacement signal than a high pulse frequency of the pulse input displacement signal.

In the preferred embodiment of FIG. 3 the non-linear function is calculated by a computer 28 of an interactive image analysis system. The image analysis system is completed by a monitor 30 and a keyboard 32 and a camera mounted on the microscope (not shown). The program processor board 28b is adapted to perform optical pattern recognition in a specimen like a biologic cell tissue. The calculation of a non-linear function according to Equation 2 and FIG. 4 is performed by a program running in the background mode of the computer 28. But the invention is also useful, when the non-linear function is calculated by a non-inter-active processor.

Returning to FIG. 3, the motor driver circuit 28c can drive up to four low resistance stepper motors in full step mode. Provided that the resistance of the motor allows microstepping, the motor driver circuit 28c supports microstepping up to a ratio of 1/200. Two motors can be operated in parallel which makes the motor driver circuit 28c suited to drive the x motor 34 and the y motor 36 of the microscope stage 38. Each motor can be provided with a maximum current of 0.3 A per phase. In the preferred embodiment the motors 34 and 36 have two phases as is normally the case. The 0.3 A limit determines the maximum speed of the motor. If the power supply of the computer 28 is too limited to drive the stage motors 34 and 36, the motor driver circuit 28c supports a connector to an external 12 Volt power supply.

The pulse decoder circuit 28a and the motor driver circuit 28c may be integrated on one printed circuit board. This board is ISA-bus compatible. This means that the computer 28 preferably has an ISA or EISA bus.

The x motor 34 rotates a spindle having a threading for shifting a correspondingly threaded member of the stage in the conventional manner. The y motor 36 actuates the stage 38 in y direction in the same conventional manner. Several types of motors and spindles can be used. However, according to various tests, a stepper motor having 200 microsteps in combination with a 4 mm spindle should be preferred. The distance between two adjacent wells of the spindle may have the values of 0.4, 1, 2 or 4 mm, but the 4 mm spindle yields the best results if combined with a stepper motor requiring 40000 steps for a full revolution. Hence the electromechanical transducers 34 or 36 for displacing the platform 39 along one of the coordinates x or y operates at a transduction factor.

$$P_{min} = 4 \text{ mm}/40000 \text{ steps} \hspace{2cm} \text{(Equation 3)}$$
$$= 0.1 \text{ } \mu m/\text{step}$$

The factor according to Equation 3 is called the minimum position accuracy $P_{min}$, because a single pulse from the angle encoder 24 or 26 corresponds to minimally one step of the stage motor 34 or 36. Thus, at very low speed the non-linear function according to Equation 2 and FIG. 4 produces displacement steps according to the required optical resolution. The required optical resolution depends on the magnification of the objective lens used. Consequently, the smallest displacement step for matching the required optical resolution may be adjusted by the computer 28 according to the magnification of the objective lens. In an application where a specimen requiring less resolution is investigated, an objective lens of lower magnification may be used and a minimum position accuracy $p_{min}$ of 1 to 2 $\mu$m may be sufficient. Referring to Equation 3 a stepper motor having 4000 steps per revolution would be sufficient. Hence the apparatus according to FIG. 3 can be modified to serve non-biological specimens which normally require less resolution.

In the preferred embodiment the motor drive signal $S_m$ is a pulse signal and the speed of the stage $S_s$ can be determined from the motor speed $S_m$ by:

$$s_s(i) = s_m(i) * P_{min} (\text{mm/s}) \hspace{2cm} \text{(Equation 4)}$$

The maximum speed of the stage can be calculated since the motor speed $s_m$ can not exceed 17000 steps per second:

$$S_{s\ max} = 170000 * 0.1 \mu m/s = 17 \text{ mm/s} \hspace{2cm} \text{(Equation 5)}$$

This value matches the displacement of the conventional manual stage according to FIG. 1.

Instead of the preferred stepper motors 34 and 36 servo motors may be used for displacing the platform 39. Such a modification would require a step-like analogue DC signal as a motor drive signal. A few hardware adjustments make it possible to optimize the motor driver circuit 28c for servo motors. The servo motor is associated with a position detector in the known manner. It is possible to connect the associated position detector to the computer 28 for acting as a position readout facility. In the preferred embodiment however, the platform 39 is provided with conventional position readout facilities connected to the computer 28. Such conventional readout facilities which inform the computer 28 on the actual x,y position of the platform 39 are not depicted in FIG. 3.

Each motor/spindle arrangement 34 and 36 has an end switch to stop the motor at an extreme displacement position of the platform 39. The two end switches are not depicted in FIG. 3.

FIG. 5 is a displacement timing diagram for comparing the system input and the system response. There is nearly no delay between the manual operation of the wheels 2 or 4 and the visual displacement of the platform 39. The human visual system is only capable of registering delays of more than 50 ms. This is well above our sample interval of 13 ms. Hence, to avoid any visual effect, the response time of the displacement signal channel must be below 50 ms–13 ms=37 ms. For low speed displacements this is no problem. For very high speed displacements, when $s_a\, c_{sw}$ is greater than 170000 (see Equation 2), the user may observe a minor delay in exceptional cases.

In the preferred embodiment the manually actuated displacement means for mechanically providing an input signal of the desired displacement in two directions x,y are two coaxially arranged independently operable wheels 2, 4 located below the platform 39. However, the advantages of the non-linear transformation according to FIG. 4 and 5 are likewise achievable, when a so-called mouse or a so-called joystick are engaged as a manually actuated displacement means. Both the mouse and the joystick have a ball element rotated by the friction of a table surface. The rotating ball element drives two rolls which may take the function of the x wheel 2 and the y wheel 4. If a mouse or a joystick are used as a manual input displacement means their function may be switched from a monitor cursor mode to the stage scanning mode.

Turning to FIG. 6 and 7, the platform 39 of the microscope stage 38 is depicted in more detail. The preferred platform 39 is adapted to a support biologic specimen. The platform 39 comprises a x plate 46 and an associated drive means 34 operable for displacement in the x direction. The platform 39 comprises also a y plate 44 and associated drive means 36 operable for displacing the platform 39 in the y direction.

It is preferred that the upper plate is the y plate 44 operable for displacement in the y direction, i.e. away from or closer to the observer. But it is also possible that the upper plate is the x plate 46 operable for displacement in the x direction, i.e. to the left or to the right with respect to the observer.

It is important for the invention that the position drive means 34 and 36 are arranged below the level of the flat top surface of the platform, i.e. the position drive means do not rise above the level of the flat top surface at the front side, the left-hand side and the right-hand side of the platform. By this feature the platform 39 is easily accessible to the user.

In the preferred embodiment the platform 39 has two working areas 40 and 42 in the upper plate 44. The two working areas 40 and 42 are consecutively used for viewing a specimen slide (43 in FIG. 7). The two working areas 40 and 42 may be arranged on a line extending from the observer, i.e. in the y direction (FIG. 5). The working area 40 next to the observer is a previewing area. Previewing is performed by manually shifting a slide on the flat top surface of the platform 39. The other working area 42 is a scanning area. The scanning area 42 is provided with a specimen holder 48 and a clip 50 for accurate repositioning of fixing the slide. The fixed slide is dislocated in the manner described in conjunction with FIG. 2, 3, 4 and 5.

The previewing area 40 may be alternatively arranged on a line extending in the x-direction (FIG. 7) or in any other relative position to the spanning area 42. A guide member 49 may be used for guiding the slide 43 to the clamping position. The clip 50 may reposition the slide 50 against stop members 51.

The microscope stage 38 further comprises a position switch button 54 which is connected to the program processor board 28b of the computer 28 by means of a cable 56.

In operation, the user actuates the position switch button 54 and causes the computer 28 to switch the position of the platform 39 between the two working areas 40 and 42. If a new slide 43 has to be viewed, the previewing area 40 is positioned in the optical path of the microscope. The user places the slide onto the previewing area 40 and detects interesting areas by shifting the slide. Thereafter, the user fixes the slide onto the scanning area 42 with the aid of the rectangular specimen holder 48 and the spring-biased clip 50. By pressing the position switch button 54, the user causes the computer 28 to position the scanning area 42 into the optical path of the microscope. This is the moment when the interactive scanning of the specimen starts. The user actuates the x wheel 2 or the y wheel 4, whereby he is familiar with the location of the handling wheels on the stage and the mechanical resistance which is felt by the user. Nevertheless the viewing task is eased, because small displacements of the stage are performed with high accuracy and large displacements of the stage are performed with a minimum of handling activity. If the observer has identified an interesting area of the specimen, a position memorizing button 52 allows for memorizing in the computer 28 the position of this area. By pressing the position memorizing button 52 a signal is sent to the program processor board 28b via cable 56 which causes the computer 28 to read the position signals of the position readout facilities not shown in FIG. 6 and 7. The position signals may be the feed-back signals of the servo loop of a DC servo-motor.

The position memorizing button 52 and the position switch button 54 are located at the right-hand side of the stage 38 in the immediate neighborhood of the preferred manual displacement means 2, 4, 6, 7, 8, 10, 16, 18, 20, 22. The preferred manual displacement means given in FIG. 2a are located in conventional manner at the right-hand, rearward corner of the platform 39 and are depicted in FIG. 7. Thus, all handles are located below the flat top surface of the platform 39 and support the interactive scanning of biologic specimen.

The most important elements of the invention are summarized in the following clauses which conclude the description:

1. Method for controlling coordinate displacements of a platform, the method comprising the following steps:

providing a mechanical input signal of the desired displacement in at least one direction;

assigning a displacements means and an associated displacement signal channel to each displacement coordinate of the platform;

transducing the mechanical input signal into a number of pulses which number is proportional to the mechanical position signal in accordance with the resolution of an position encoder given in pulses per displacement unit;

transmitting the pulses to a pulse decoder which registers the number of pulses as an pulse input displacement signal for each displacement coordinate;

applying a function to the pulse input displacement signal to generate an output displacement signal in such a manner that a pulse frequency which is indicative of a low speed of displacement generates a lower output displacement signal than a pulse frequency which is indicative of a high speed of displacement;

applying the output displacement signal to a motor operably connected to said platform thereby causing a displacement of the platform corresponding to the output displacement signal.

2. Method according to clause 1, wherein the platform is a microscope stage for supporting biologic specimen.

3. Method according to clause 1, wherein the displacement means are two coaxially arranged, independently operable, manually actuated wheels.
4. Method according to clause 1, wherein the displacement means are two wheels arranged below the platform.
5. Method according to clause 1, wherein the displacement means is a rotating ball element of a computer mouse.
6. Method according to clause 1, wherein the displacement means is a rotating ball element of a computer joystick.
7. Method according to clause 1, wherein the displacement coordinates x, y form a rectangular, Cartesian coordinate system or a circular polar coordinate system.
8. Method according to clause 1, wherein the mechanical transmission from the manual displacement means to the position encoder is performed by a traction belt.
9. Method according to clause 3, wherein each position encoder is directly mounted on a shaft of the coaxial wheels.
10. Method according to clause 1, wherein the position encoder is an angle encoder.
11. Method according to clause 10, wherein the angle encoder has a resolution of $2^{10}$ to $2^{12}$ steps per revolution.
12. Method according to clause 10, wherein the angle encoder has a resolution of up to 100.000 steps per revolution.
13. Method according to clause 1, wherein the pulses transmitted from the position encoder to the pulse decoder are electrical pulses.
14. Method according to clause 1, wherein the pulses transmitted from the position encoder to the pulse decoder are electromagnetic pulses.
15. Method according to clause 1, wherein the pulse decoder comprises a counter for registering the pulses of the input displacement signal.
16. Method according to clause 1, wherein the speed relation is a non-linear square function in a predeterminable speed range, e.g. a high speed range or a low speed-range or wherein the speed relation is a nonlinear function of the logarithmic or exponential in a predetermined low speed range.
17. Method according to clause 16, wherein, at very low speed, the non-linear function produces displacement steps in x and y direction according to the required optical resolution of an objective lens.
18. Method according to claim 17, wherein the smallest displacement steps for matching the required optical resolution can be adjusted according to the magnification of the objective lens used.
19. Method according to claim 1, wherein the non-linear function is calculated by a non-interactive processor.
20. Method according to claim 1, wherein the non-linear function is calculated by a computer of an interactive image analysis system.
21. Method according to clause 20, wherein the calculation of the non-linear function is performed by a program running in the back-ground mode of the computer.
22. Method according to clause 21, wherein the result of the non-linear transformation is converted into the output displacement signal by a motor driver circuit of the computer.
23. Method according to clause 22, wherein the motor drive signal is a step-like analog direct current.
24. Method according to clause 22, wherein the motor drive signal is a pulse signal.
25. Method according to clause 24, wherein the motor for displacing the platform is a stepper motor.
26. Method according to clause 23, wherein the motor for displacing the platform is a servo-motor.
27. Method according to clause 1, wherein each motor displaces the platform by a spindle arrangement having an end switch to stop the motor at an extreme displacement position of the platform.
28. Method according to clause 27, wherein adjacent wells of the spindle have a distance of about 4 mm and the motors allows for microstepping of about 40,000 steps per revolution.
29. Method according to clause 20, wherein the platform is provided with position read-out facilities connected to the computer, in particular the position read-out of a servo drive mechanism is coupled to the computer.
30. Method according to clause 29, wherein a button allows for memorizing in the computer the position signals of the position read-out facilities.
31. Method according to clause 30, wherein the position memorizing button is located in the neighborhood of the manual displacement means.
32. Method for controlling coordinate displacements of a platform in a microscope stage, the method comprising the following steps:
providing an input signal of the desired displacement in two directions x, y by manually actuating two coaxially arranged, independently operable wheels;
assigning the first wheel and an associated displacement signal channel to the x-coordinate and assigning the second wheel associated with a second displacement signal channel to the y-coordinate of the platform;
transmitting the mechanical input signal indicating the desired displacement to a position encoder acting as an electromechanical transducer;
transducing the mechanical input signal of the position encoder into a number of pulses which number is proportional to the mechanical input position signal in accordance with the resolution of the position encoder given in pulses per displacement unit;
transmitting the pulses to a pulse decoder which registers the pulse input displacement signal for each coordinate x, y;
converting the pulse input signal into a motor drive signal; and
driving a motor by the output of each displacement signal channel, each motor acting as an electromechanical transducer for displacing the platform along the coordinates x, y.
33. Method according to clause 32, wherein the platform is a microscope stage for supporting biologic specimen.
34. Method according to clause 32, wherein the coaxial wheels are arranged below the platform.
35. Method according to clause 32, wherein the displacement coordinates x, y form a rectangular, Cartesian coordinate system or a circular polar coordinate system.
36. Method according to clause 32, wherein the mechanical transmission from the displacement means,to the position encoder is performed by a traction belt.
37. Method according to clause 32, wherein each position encoder is directly mounted on a shaft of the coaxial wheels.
38. Method according to clause 32, wherein the position encoder is an angle encoder.
39. Method according to clause 38, wherein the angle encoder has a resolution of $2^{10}$ to $2^{12}$ steps per revolution.
40. Method according to clause 38, wherein the angle encoder has a resolution of up to 100.000 steps per revolution.
41. Method according to clause 32, wherein the pulses transmitted from the position encoder to the pulse decoder are electrical pulses.

42. Method according to clause 32, wherein the pulses transmitted from the position encoder to the pulse decoder are electromagnetical pulses.

43. Method according to clause 32, wherein the pulse decoder comprises a counter lor registering the pulses of the input displacement signal.

44. Method according to clause 32, wherein a non-linear function is applied to the pulse input displacement signal of the pulse decoder and the result of the non-linear transformation is converted into the motor drive signal.

45. Method according to clause 44, wherein the nona-linear function applied to the pulse counts depends on the speed of the manual actuation of the displacement means.

46. Method according to clause 45, wherein a low pulse frequency generates a lower output displacement signal than a high pulse frequency of the pulse input displacement signal.

47. Method according to clause 46, wherein the non-linear speed relation is a quadratic function in a predeterminable low speed range.

48. Method according to clause 47, wherein, at very low speed, the non-linear function produces displacement steps according to the required optical resolution.

49. Method according to clause 48, wherein the smallest displacement steps for matching the required optical resolution can be adjusted according to the magnification of the objective lens used.

50. Method according to clause 44, wherein the non-linear function is calculated by a non-interactive processor.

51. Method according to clause 44, wherein the non-linear function is calculated by a computer of an interactive image analysis system.

52. Method according to clause 51, wherein the calculation of the non-linear function i; performed by a program rnning in the back-ground mode of the computer.

53. Method according to clause 52, wherein the result of the non-linear transformation is converted into the motor drive signal by a motor driver circuit of the computer.

54. Method according to clause 53, wherein the motor drive signal is a step-like analog direct current.

55. Method according to clause 53, wherein the motor drive signal is a pulse signal.

56. Method according to clause 32, wherein the motor for displacing the platform is a stepper motor.

57. Method according to clause 32, wherein the motor for displacing the platform is a servo-motor.

58. Method according to clause 32, wherein each motor displaces the platform by a spindle arrangement have an end switch to stop the motor at an extreme displacement position of the platform.

59. Method according to clause 51, wherein the platform is provided with position read-out facilities connected to the computer.

60. Method according to clause 59, wherein a button allows for memorizing in the computer the position signals of the position read-out facilities.

61. Method according to clause 60, wherein the position memorizing button is located in the neighborhood of the two coaxially arranged wheels.

62. A microscope stage having a platform with a substantially flat top surface
comprising a first plate and a first drive means operably connected to said plate for displacement thereof in a first direction x and a second direction y,
and a second plate displaceably mounted on said first plate and a second drive means operably connected for displacement of said second plate,
wherein the first and second drive means for actuating the x and y coordinate displacements are arranged below the level of the substantially flat top surface of the platform, such that the position drive means do not rise above the level of the substantially flat top surface at the front side, the left-hand side and the right-hand side of the platform,
and wherein the platform has two illuminable working areas in the upper one of the two plates for viewing a specimen slide.

63. Microscope stage according to clause 62, wherein the upper plate is operable for displacement in the y direction.

64. Microscope stage according to clause 62, wherein the upper plate is operable for displacement in the x direction.

65. Microscope stage according to clause 62, wherein the two working areas are arranged on a line extending from the observer position in the y direction or on a line x-ending the x-direction.

66. Microscope stage according to clause 65, wherein the working area next to the observer position is a previewing area.

67. Microscope stage according to clause 66, wherein previewing is performable by manual displacement of a slide on the flat top service of the platform.

68. Microscope stage according to clause 65, wherein the working area located far from the observer and/or left from the observer position is a scanning area.

69. Microscope stage according to clause 68, wherein the scanning area is provided with a high-accuracy repositioning fixture, e.g. a specimen holder and a clip for fixing a slide and a guide member for guiding the slide to the clamping position.

70. Microscope stage according to clause 68, wherein the displacements of the scanning area are performed under computer control.

71. Microscope stage according to clause 70, comprising a button for causing the computer to switch between the positions of the two working areas.

72. Microscope stage according to clause 71, wherein the position switch button is located in the neighborhood of the first and second position drive means below the flat top surface of the platform.

73. In an image analysis system comprising a microscope, at least one TV camera, and a computer station, in an apparatus for controlling coordinate displacements of a platform comprising:
manually actuated displacements means for mechanically providing an input signal of the desired displacement in two directions x, y;
first displacements means and an associated displacement signal channel assigned to the x-coordinate and second displacement means associated with a second displacement signal channel assigned to the y-coordinate of the platform;
means for transmitting the mechanical input signal indicating the desired displacement to a position encoder acting as an electromechanical transducer;
position encoder means for transducing the mechanical input signal into a number of pulses which number is proportional to the mechanical position signal in accordance with the resolution of the position encoder given in pulses per displacement unit;
a pulse decoder which receives the transmitted pulses and registers the pulse input displacement signal for each coordinate x, y;
electrical means for calculating a pulse output displacement signal from the pulse input displacement signal;

driver means for converting the result of the pulse transformation into a motor drive signal; and a motor at the output of each displacement signal channel, each motor acting as an electromechanical transducer for displacing the platform along the coordinates x, y.

74. Apparatus according to clause 73, wherein the platform is a microscope stage for supporting biologic specimen.
75. Apparatus according to clause 73, wherein the manually actuated displacement means are two coaxially arranged, independently operable wheels.
76. Apparatus according to clause 73, wherein the displacement means are two wheels arranged below the platform.
77. Apparatus according to clause 73, wherein the displacement means are driven by a rotating ball of a so-called mouse.
78. Apparatus according to clause 73, wherein the displacement means are driven by a rotating ball of a so-called joystick.
79. Apparatus according to clause 73, wherein the mechanical transmission from the displacement means to the position encoder is performed by a traction belt.
80. Apparatus according to clause 75, wherein each position encoder is directly mounted on a shaft of the coaxial cascaded wheels.
81. Apparatus according to clause 73, wherein the position encoder an angle encoder.
82. Apparatus according to clause 81, wherein the angle encoder has a resolution of $2^{10}$ to $2^{12}$ steps per revolution.
83. Apparatus according to clause 81, wherein the angle encoder has a resolution of up to 100.000 steps per revolution.
84. Apparatus according to clause 73, wherein the pulses transmitted from the position encoder to the pulse decoder are electrical pulses.
85. Apparatus according to clause 73, wherein the pulses transmitted from the position encoder to the pulse decoder are electromagnetical pulses.
86. Apparatus according to clause 73, wherein the pulse decoder comprises a counter for registering the pulses of the input displacement signal.
87. Apparatus according to clause 73, wherein a non-linear function is applied to the pulse input displacement signal by the electrical means and the result of the non-linear transformation is converted into the motor drive signal.
88. Apparatus according to clause 87, wherein the non-linear function applied to the pulse counts depends on the speed of the manual actuation of the displacement means.
89. Apparatus according to clause 88, wherein a low pulse frequency generates a lower output displacement signal than a high pulse frequency of the pulse input displacement signal.
90. Apparatus according to clause 89, wherein the non-linear speed relation is a quadratic function in a predeterminable low speed range.
91. Apparatus according to clause 90, wherein, at very low speed, the non-linear function produces displacement steps according to the required optical resolution.
92. Apparatus according to clause 91, wherein the smallest displacement steps for matching the required optical resolution is adjusted by the electrical means according to the magnification of the objective lens used.
93. Apparatus according to clause 87, wherein the non-linear function is calculated by a non-interactive processor.
94. Apparatus according to clause 87, wherein the non-linear function is calculated by a computer of an interactive image analysis system.
95. Apparatus according to clause 94, wherein the calculation of the non-linear function is performed by a program running in the to back-ground mode of the computer.
96. Apparatus according to clause 95, wherein the result of the non-linear transformation is converted by a motor driver circuit of the computer.
97. Apparatus according to clause 96, wherein the motor drive signal is a step-like analog direct current.
98. Apparatus according to clause 96, wherein the motor drive signal is a pulse signal.
99. Apparatus according to clause 73, wherein the motor for displacing the platform is a stepper motor.
100. Apparatus according to clause 73, wherein the motor for displacing the platform is a servo-motor.
101. Apparatus according to clause 73, wherein each motor displaces the platform by a spindle arrangement having an end switch to stop the motor at an extreme displacement position of the platform.
102. Apparatus according to clause 94, wherein the platform is provided with position read-out facilities connected to the computer.
103. Apparatus according to clause 102, wherein a button allows for memorizing in the computer the position signals of the position read-out facilities.
104. Apparatus according to clause 103, wherein the position memorizing button is located in the neighborhood of the manual displacement means.

What is claimed is:

1. In an image analysis system comprising a microscope, at least one TV camera mounted on the microscope, and a computer station in communication with the microscope, an apparatus for controlling coordinate displacements of a platform comprising:

manually actuated displacements means for mechanically providing an input signal of the desired displacement in two directions x, y;

first displacements means and an associated displacement signal channel assigned to the x-coordinate and second displacement means associated with a second displacement signal channel assigned to the y-coordinate of the platform;

means for transmitting the mechanical input signal indicating the desired displacement to a position encoder acting as an electromechanical transducer;

position encoder for transducing the mechanical input signal into a number of pulses which number is proportional to the mechanical input signal in accordance with the resolution of the position encoder given in pulses per displacement unit;

a pulse decoder which receives the transmitted pulses and registers the pulse input displacement signal for each coordinate x, y;

electrical means for transforming a pulse output displacement signal from the pulse input displacement signal;

driver means for converting the result of the pulse transformation into a motor drive signal; and a motor at the output of each displacement signal channel, each motor acting as an electromechanical transducer for displacing the platform along the coordinates x, y.

2. Apparatus according to claim 1, wherein the manually actuated displacement means are two coaxially arranged, independently operable wheels located below the platform.

3. Apparatus according to claim 2, wherein a non-linear function is applied to the pulse input displacement signal by the electrical means and the result of the non-linear transformation is converted into the motor drive signal and wherein the non-linear function applied to the pulse input displacement signal depends on the speed of the manual actuation of the displacement means, whereby a low pulse frequency generates a lower output displacement signal than a high pulse frequency of the pulse input displacement signal.

4. Apparatus according to claim 3, wherein the platform is provided with position read-out facilities connected to the computer and wherein a button allows for memorizing in the computer the position signals of the position read-out facilities and wherein the position memorizing button is located in the neighborhood of the manual displacement means.

* * * * *